(12) United States Patent
Aragones et al.

(10) Patent No.: US 7,819,135 B2
(45) Date of Patent: Oct. 26, 2010

(54) RIGID COUPLING DEVICE FOR PRESSURIZED FLUID-CONDUITS

(75) Inventors: David Aragones, Sciez (FR); Sylvain Giagnoli, Ambilly (FR); Jean-Pierre Anodeau, Cranves Sales (FR)

(73) Assignee: Parker Hannifin France SAS, Annemasse (FR)

( * ) Notice: Subject to any disclaimer, the term of this patent is extended or adjusted under 35 U.S.C. 154(b) by 306 days.

(21) Appl. No.: 12/136,941

(22) Filed: Jun. 11, 2008

(65) Prior Publication Data

US 2008/0289702 A1 Nov. 27, 2008

Related U.S. Application Data

(63) Continuation of application No. PCT/FR2006/002698, filed on Dec. 11, 2006.

(30) Foreign Application Priority Data

Dec. 20, 2005 (FR) .................................. 05 12953

(51) Int. Cl.
*F16L 37/32* (2006.01)
(52) U.S. Cl. .............................. 137/614.04; 137/614.02; 137/614.03; 251/149.6
(58) Field of Classification Search .................. 137/614.02–614.06; 251/149.6
See application file for complete search history.

(56) References Cited

U.S. PATENT DOCUMENTS

| | | | | | |
|---|---|---|---|---|---|
| 2,735,696 | A | * | 2/1956 | Omon et al. ............ | 137/614.05 |
| 4,098,292 | A | * | 7/1978 | Evans .................... | 137/614.04 |
| 4,181,150 | A | * | 1/1980 | Maldavs ................ | 137/614.06 |
| 4,200,121 | A | * | 4/1980 | Walter et al. ........... | 137/614.05 |
| 4,221,235 | A | * | 9/1980 | Maldavs ................ | 137/614.04 |
| 4,388,947 | A | * | 6/1983 | Steuerwald ............ | 137/614.06 |
| 4,436,125 | A | * | 3/1984 | Blenkush ................ | 251/149.6 |
| 4,543,994 | A | * | 10/1985 | Johnson et al. ........ | 137/614.04 |
| 4,546,956 | A | * | 10/1985 | Moberg ................... | 251/149.6 |
| 4,679,618 | A | * | 7/1987 | Farkas ........................ | 251/144 |
| 4,856,282 | A | * | 8/1989 | Leigh-Monstevens et al. | 60/589 |
| 4,982,761 | A | * | 1/1991 | Kreczko et al. ........ | 137/614.03 |
| 5,054,743 | A | * | 10/1991 | Norkey et al. ........... | 251/149.6 |
| 5,056,756 | A | * | 10/1991 | Norkey et al. ........... | 251/149.6 |
| 5,338,002 | A | * | 8/1994 | McNaughton et al. ... | 251/149.6 |
| 5,494,074 | A | * | 2/1996 | Ramacier et al. ........ | 137/614.04 |

(Continued)

FOREIGN PATENT DOCUMENTS

EP 0 847 511 B 4/1999

(Continued)

*Primary Examiner*—John Rivell
*Assistant Examiner*—Craig Price
(74) *Attorney, Agent, or Firm*—John A. Molnar, Jr.

(57) ABSTRACT

The rigid coupling device includes a closure valve extended by a retractable sliding stop member of general tubular shape made from elastically deformable material, having at least one outward radial projection forming a stop against a corresponding inward radial projection of a movable interior body that contains the valve. The stop member has an open end opposite the opening of the cylindrical cavity of one end connecting to the conduit. Simultaneous withdrawal of the interior body and of the valve into the interior body has the effect of causing this open end to contract, forcibly inserting it into the cylindrical cavity of the connecting end in such a manner as to overcome the stop.

6 Claims, 7 Drawing Sheets

U.S. PATENT DOCUMENTS

| | | | | |
|---|---|---|---|---|
| 5,709,243 | A | * | 1/1998 | Wells et al. ............ 137/614.03 |
| 5,785,693 | A | * | 7/1998 | Haining .................... 251/149.6 |
| 5,911,403 | A | * | 6/1999 | deCler et al. ............. 251/149.6 |
| 6,041,818 | A | * | 3/2000 | Schadewald et al. ... 137/614.05 |
| 6,161,579 | A | * | 12/2000 | Vulliet ................... 137/614.05 |
| 6,609,696 | B2 | * | 8/2003 | Enerson ................... 251/149.6 |
| 6,883,542 | B2 | * | 4/2005 | Kuraguchi et al. ....... 251/149.6 |
| 6,886,804 | B2 | * | 5/2005 | Doi et al. ................. 251/149.6 |
| 7,168,449 | B2 | * | 1/2007 | Giagnoli et al. ........ 137/614.04 |
| 2002/0117645 | A1 | * | 8/2002 | Kiehne .................... 251/149.6 |
| 2004/0084650 | A1 | * | 5/2004 | Nicolino et al. .......... 251/149.6 |
| 2006/0151032 | A1 | * | 7/2006 | Giagnoli et al. ........ 137/614.04 |
| 2009/0026401 | A1 | * | 1/2009 | Dobkins ................... 251/149.6 |

FOREIGN PATENT DOCUMENTS

| | | |
|---|---|---|
| FR | 2 758 379 | 7/1998 |
| WO | 94 10494 A1 | 5/1994 |
| WO | 2006 037971 A1 | 4/2006 |

\* cited by examiner

RIGID COUPLING DEVICE FOR PRESSURIZED FLUID-CONDUITS

CROSS REFERENCE TO RELATED APPLICATIONS

This application is continuation of copending International Application No. PCT/FR06/002698 filed Dec. 11, 2006, which designated the United States, and which claims priority to French Patent Application No. FR 05/12953, filed Dec. 20, 2005, the disclosures of each of which is expressly incorporated herein by reference.

BACKGROUND OF THE INVENTION

The present invention relates to a rigid coupling for pipes carrying pressurized fluid, allowing these pipes to be connected while pressurized fluid remains in one of them.

This coupling comprises, in a way known per se, a male element and a female element of which the ends that are to be connected are closed by valves. The male element, connected to a tool actuated by the fluid, contains pressurized fluid, while the female element connected to the fluid source is not under pressure.

Patent EP 0 847 511, in the name of the applicant, describes a coupling such as this in which the female element has a fixed external sleeve with an end for connection to a pipe supplying hydraulic fluid, and a slideable internal body containing the valve of the female element, a return spring being interposed between the external sleeve and the mobile internal body.

Each valve comprises a valve shutter that presses against the valve shutter of the other valve upon connection, a return spring pressing this shutter against a seat and a limit stop limiting the opening travel of the shutter.

The limit stop of the male element containing pressurized fluid is fixed, while the limit stop of the female element is slideably mounted in the female element so that it can occupy a forward fixed position in which the shutter is pressed against the limit stop when the male and female elements are connected, and so as to be able to retreat into the female element so as to allow the shutter associated therewith to retreat further than the aforementioned opening travel, the distance retreated corresponding substantially to the opening travel of the shutter of the male element.

The coupling also comprises means of locking and of returning the sliding limit stop into/in the forward position, these means allowing the retreating movement of the sliding limit stop upon connection of the male and female elements, and locking the sliding limit stop in the forward position once this connection has been made.

In a coupling such as this it is necessary to allow the mobile internal body to move in and out with respect to the fixed external sleeve. For this reason, it is common practice for the internal body that can move inside the fixed external sleeve to be "hydraulically balanced", that is to say to use relationships between pressures and surface areas such that the sum of the forces generated by the pressure effects cancel each other out.

The return spring acting on the mobile internal body is capable of compensating for the small potential difference in forces that may be due to manufacturing tolerances manifested in the form of different diameters and different levels of friction.

Here, the technique used is the one known as "differential balancing".

The central fluid stream is continuous. Three sealing members are used, two of identical diameter D1 and a third of a higher diameter D2 such that $D2/D1=\sqrt{2}$. This relationship allows the sealing cross section of small diameter D1 to be the same as the cross section of the annulus formed between the small diameter D1 and the large diameter D2.

The supply of pressurized fluid to the annulus between the large and small diameters is achieved via a through-hole passing through the mobile internal body.

The forces exerted on the two small-diameter sealing members and on the annulus between the large and small diameter are of the same magnitude but of opposite directions, thus balancing the position of the mobile internal body in the fixed external sleeve at a location predefined by the limit stops of the return spring that returns the internal body.

This technique is economically attractive as to the production of the mechanical parts and displays good hydrodynamic characteristics, but the mechanical relationship between the mobile internal body which notably bears the female shutter and the fixed external sleeve is complicated to achieve.

To achieve this mechanical relationship, the means for locking and for returning the sliding limit stop in/into the forward position usually comprise mobile sleeve tubes internal and external to the mobile internal body of the female element, and connected to one another via balls or pegs passing through the mobile internal body.

These elements both balance (in the hydraulic sense) the positions of the shutters of the male and female elements in a position such that the circuit is open to the hydraulic fluid, and allow the shutter to effect an overtravel inside the female element in order mechanically to lock the male and female elements in spite of the approximately 3 to 4 mm protrusion of the shutter of the male element, which protrusion is due to the pressurized fluid contained therein.

Because the male and female elements are mechanically connected and locked, the opening of the hydraulic circuit, and therefore the balancing of the shutters of the male and female elements, is done by subjecting the female element to the hydraulic line pressure until such point as the pressure therein is enough to counter the pressure in the male element and open the valve thereof.

This arrangement calls for a great many components and thus entails a great deal of accuracy in producing and assembling these components, to the detriment of the overall cost of the product.

SUMMARY OF THE INVENTION

The present invention aims to avoid these disadvantages by providing a rigid coupling for pipes carrying pressurized fluid, comprising a lower number of components, particularly for selectively locking and returning the sliding limit stop in/into the forward position.

To this end, the subject of the present invention is a rigid coupling for pipes carrying pressurized fluid, as described in the preamble, and in which the shutter of the female element is extended at the rear by a retractable limit stop member of substantially tubular overall shape made of an elastically deformable material having at least one outward radial projection forming a limit stop against a corresponding inward radial projection of the internal body, and an open end facing the mouth of the cylindrical cavity in the connection end, the simultaneous retreat of the internal body inside the external sleeve and of the shutter inside the internal body having the effect of narrowing this open end by forcibly inserting it into said cylindrical cavity at the connection end, so as to retract said limit stop.

Thus, the inventive idea is to combine the shutter of the female element with a single member bearing the limit stop for the shutter and capable of deforming elastically upon connection of the male and female elements so as to retract the limit stop and allow the shutter its overtravel. This elastic member prevents the possibility of the shutter of the female element being driven into the female element under the effect of an axial load due to the hydrodynamic forces of the "male-to-female" flow and accidentally shutting off the circuit. This coupling is inexpensive to produce because it comprises just one elastic limit stop member.

Advantageously, the mouth of the cylindrical cavity at the connection end is chamfered in such a way as to form an annular ramp, and the open end of the retractable limit stop member is of frustoconical shape so that it can slide against this annular ramp, become narrowed, and enter the cavity.

In an illustrative embodiment, the retractable limit stop member has at least two longitudinal slots creating longitudinal legs which are kept in the normal position by the elasticity of the limit stop member.

The retractable limit stop member for example comprises an anterior part for attachment to the shutter and a rod-shaped main body provided with at least two guide fins projecting radially outward, which do not disrupt the flow of fluid and position and guide the sliding of the limit stop member inside the internal body.

These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed description of the Invention.

DETAILED DESCRIPTION OF THE INVENTION

The coupling according to the invention depicted in the figures comprises a male element 2 and a female element 3 of which the ends that are to be connected are closed by valves.

Figure 1:
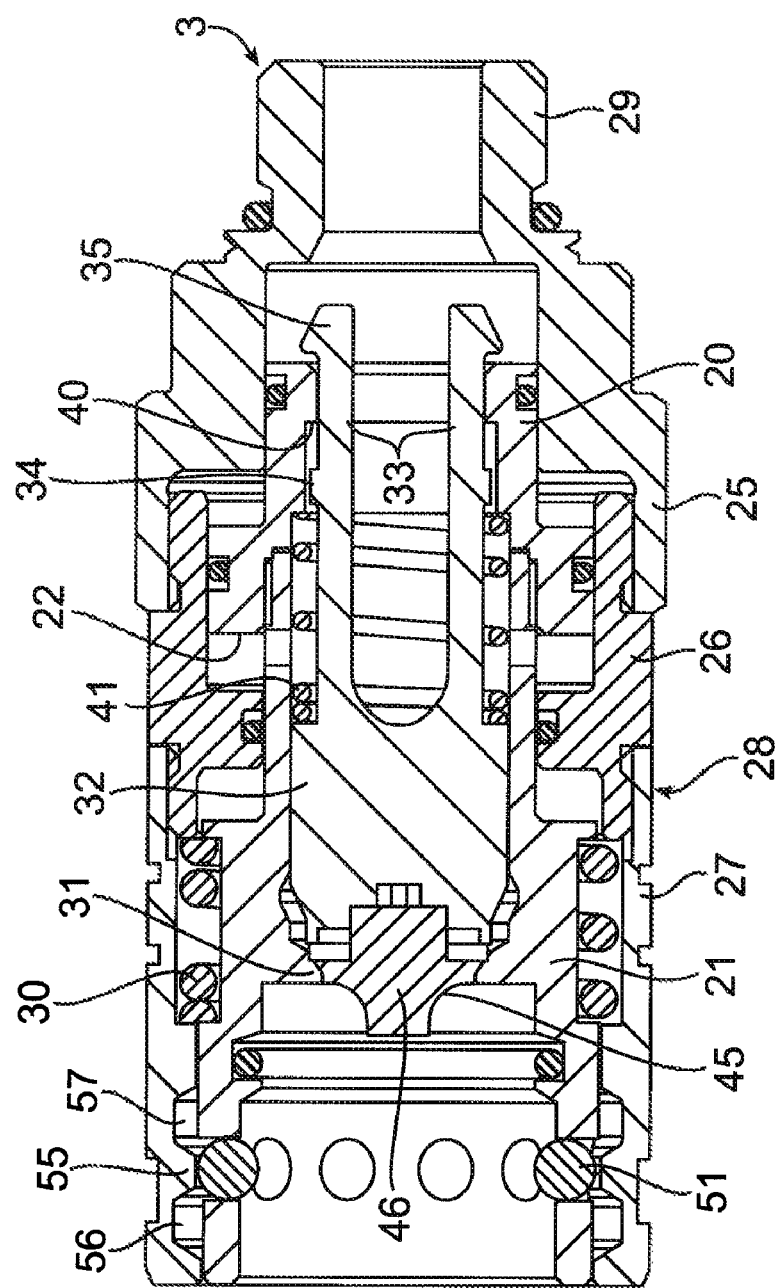
FIG. 1 is a view in longitudinal section of the female element of coupling according to the invention.

In FIG. 1, the female element 3 comprises three assembled parts 25, 26 and 27 which form a fixed external sleeve 28 and a so-called "adapter" end 29 for connecting to the pipe, and two assembled parts 20 and 21 forming an internal body 22 containing the valve of the female element 3.

The internal body 22 is able to slide with respect to the external sleeve 28, a spring 30 being interposed between the same. The spring 30 normally keeps the internal body 22 and the external sleeve 28 in the relative position shown in FIG. 1.

The valve of the female element 3 comprises a seat formed by an annular projection 31, a valve shutter 45 extended forward by a cylindrical pin 46.

The shutter 45 is extended at the rear via a retractable limit stop member 32 of substantially tubular overall shape made of a highly technical thermoplastic, with a diameter corresponding, give or take the required clearance, to the internal diameter of the part 21 of the internal body 22, so as to slide in the body 22.

Figure 2:
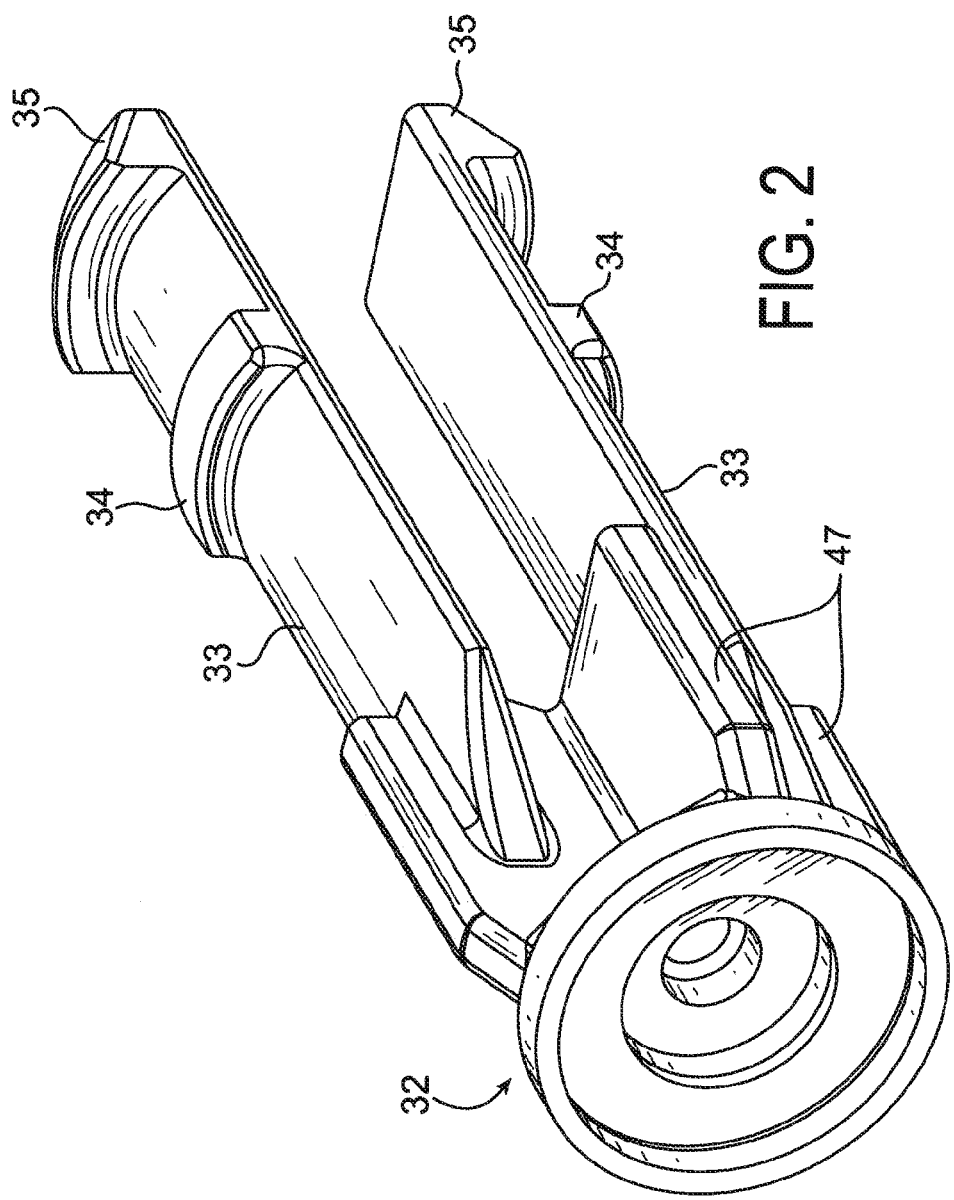
FIG. 2 is a perspective view of one component of the female element of said coupling.

As indicated more specifically in FIG. 2, the retractable limit stop member 32 comprises an anterior part for attachment to the shutter 45 and a rod-shaped main body provided with four guide fins 47 projecting radially outward. These fins 47 also position and guide the member 32 in the internal body 22 and do not disrupt the flow of fluid and can also leave a sufficiently large fluid passage cross section so that the assembly enjoys good hydrodynamic performance, that is to say presents a projected surface of approximately 100 mm$^2$.

The rear part of the retractable limit stop member 32 is open facing the mouth of the cylindrical cavity in the connection end 29, and has two longitudinal slots creating opposing and diametrically opposed longitudinal legs 33 which are kept in their normal position by the elasticity of the member 32.

The two legs 33 are elastically deformable inward in the radial direction so as to form a kind of tongs arrangement, and emerge from the internal body 22 near the end 29 for connection to the pipe.

The component 20 behind the component 21 has, in succession, from front to rear, a first internal diameter substantially corresponding to the internal diameter of the component 21, then a second internal diameter smaller than the first, and finally a third internal diameter that is smaller still, substantially corresponding to the internal diameter of the end 29 for connection to the fluid supply pipe (not depicted).

The rear wall of the fins 47 of the member 32 presses against a spring 41 which presses against a shoulder which delimits said first and second internal diameters of the component 20 of the internal body 22.

The legs 33 are surrounded by the turns of the spring 41. For this, the two legs 33 are essentially inscribed inside a cylindrical volume of a diameter corresponding, give or take the clearance, to the third internal diameter of the component 20 that forms part of the internal body 22.

However, the legs 33 each have an outward radial projection 34 the outside diameter of which corresponds, give or take the clearance, to the second internal diameter of the component 20 of the body 22. The projection 34 forms a limit stop against an annular shoulder 40 which delimits said second and third internal diameters of the component 20 of the internal body 22.

Furthermore, the ends of the legs 33 which emerge from the component 20 of the internal body 22 near the end 29 for connection to the pipe each also form an outward radial shoulder 35 inscribed inside a volume of frustoconical shape, of a shape that complements that of an annular ramp formed at the mouth of the adapter 29 and inclined toward the pipe.

The legs 33 can enter the adapter 29 by deforming radially inward under the pressure of said annular ramp at the mouth of the adapter 29 against the corresponding ramps formed by the shoulders 35 at the ends of the legs 33.

Figure 6:
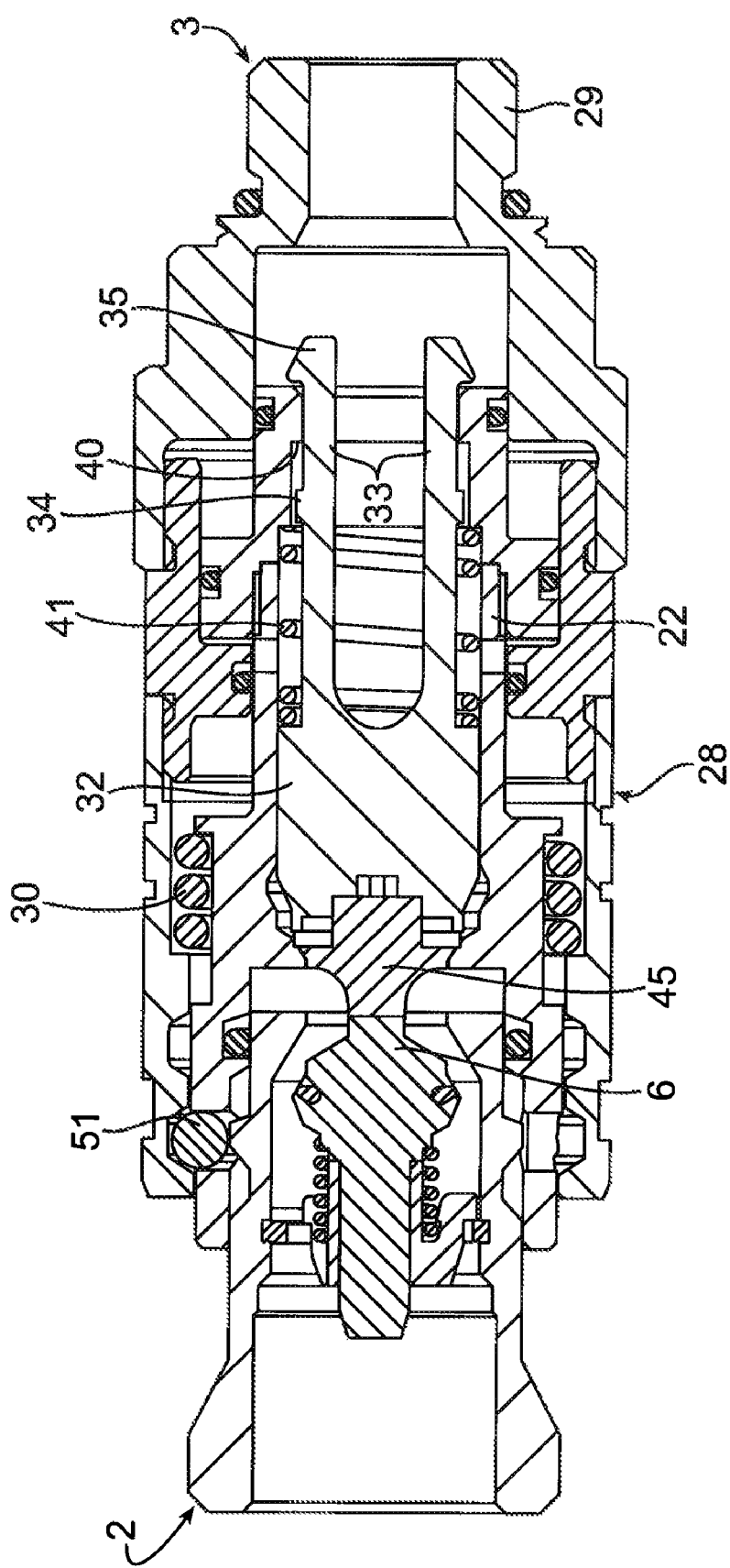
Figure 7:
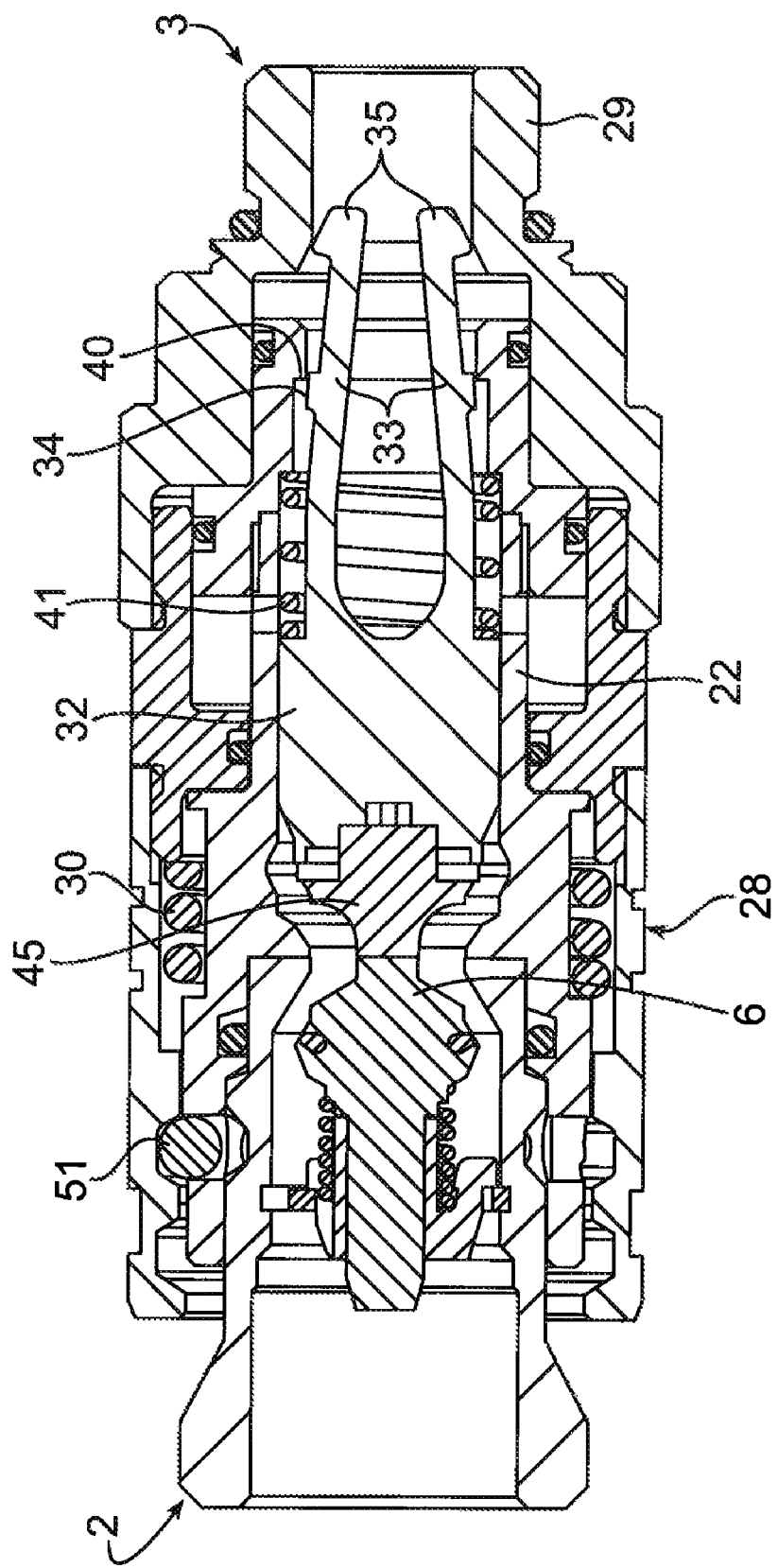
FIG. 7 is a view similar to FIG. 3 when the male element does not contain any pressurized fluid.

Furthermore the component 21 of the internal body 22 comprises, at its cavity intended to accept the male element 2, balls 51 engaged in radial bores formed through the wall of the component 21 of the body 22. These balls 51 can move radially in these bores between an internal position depicted in FIGS. 1, 4 and 5, and an external position depicted in FIGS. 3, 6 and 7.

The external sleeve 28 for its part comprises, level with the balls 51, an internal annular projection 55 with inclined lateral sides, delimiting two grooves 56 and 57.

Figure 3:
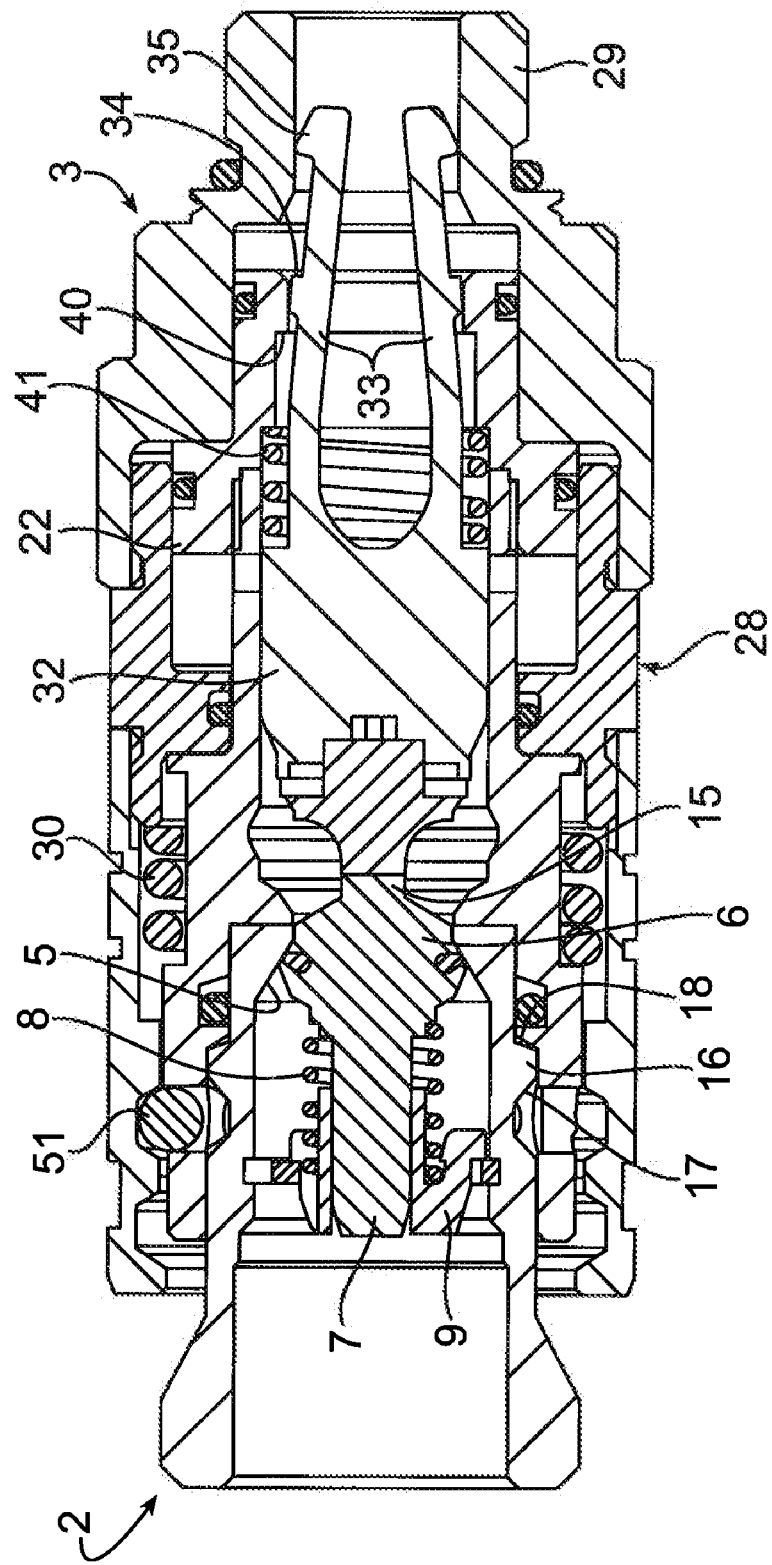
FIGS. 3-6 are views in longitudinal section, in three successive positions in the connecting with the male and female elements of the coupling.

FIG. 3 illustrates the first step in connecting the coupling that forms the subject of the invention, when the male element 2 is engaged in the cavity of the female element 3. In a way known per se, the valve of the male element comprises a seat 5, a shutter 6 extended on the inside by a guide stem 7, a return spring 8 pressing this shutter 6 against the seat 5 and a fixed limit stop 9 accepting the sliding stem 7 and against which the spring 8 presses. The limit stop 9 limits the opening travel of the shutter 6.

On the outside, the shutter 6 comprises a cylindrical pin 15 which presses against the cylindrical pin 46 of the shutter 45 of the female element upon connection of the male and female elements.

Furthermore, the male element 2 comprises an external annular projection 16 with inclined lateral sides delimiting two grooves 17 and 18.

The male element 2, connected to the tool operated by the fluid, contains pressurized fluid while the female element 3 connected to the fluid source is not under pressure.

During engagement of the male element 2, the projection 16 encounters the balls 51 which are held in their furthest-in position by the projection 55 situated facing them. At the same time, the pin 15 of the shutter 6 comes into contact with the corresponding pin 46 belonging to the shutter 45.

Continued engagement of the male element 2 causes the internal body 22 to move, to the right in the figure, with respect to the external sleeve 28.

This movement leads to compression of the springs 30 and 41, and engagement of the legs 33 inside the adapter 29 via inward radial deformation (narrowing) under the effect of the annular ramp at the mouth of the adapter 29 pressing against the corresponding ramps formed by the shoulders 35 at the ends of the legs 33.

This movement continues until the balls 51 lie facing the groove 57 and are pushed into this groove by the inclined lateral side of the projection 16.

Here, retreat against the action of the spring 41, and therefore radial deformation, of the legs 33 are significant enough that the projections 34 of the legs 33 engage "under" the annular shoulder 40 of the component 20 of the internal body 22 so that the limit stop that limits the travel of the shutter 45 is thus retracted.

With the male element 2 now completely engaged in the cavity of the female element 3, the groove 17 faces the balls 51, and these balls 51 are driven into this groove 17, thus locking the male 2 and female 3 elements together.

Figure 4:
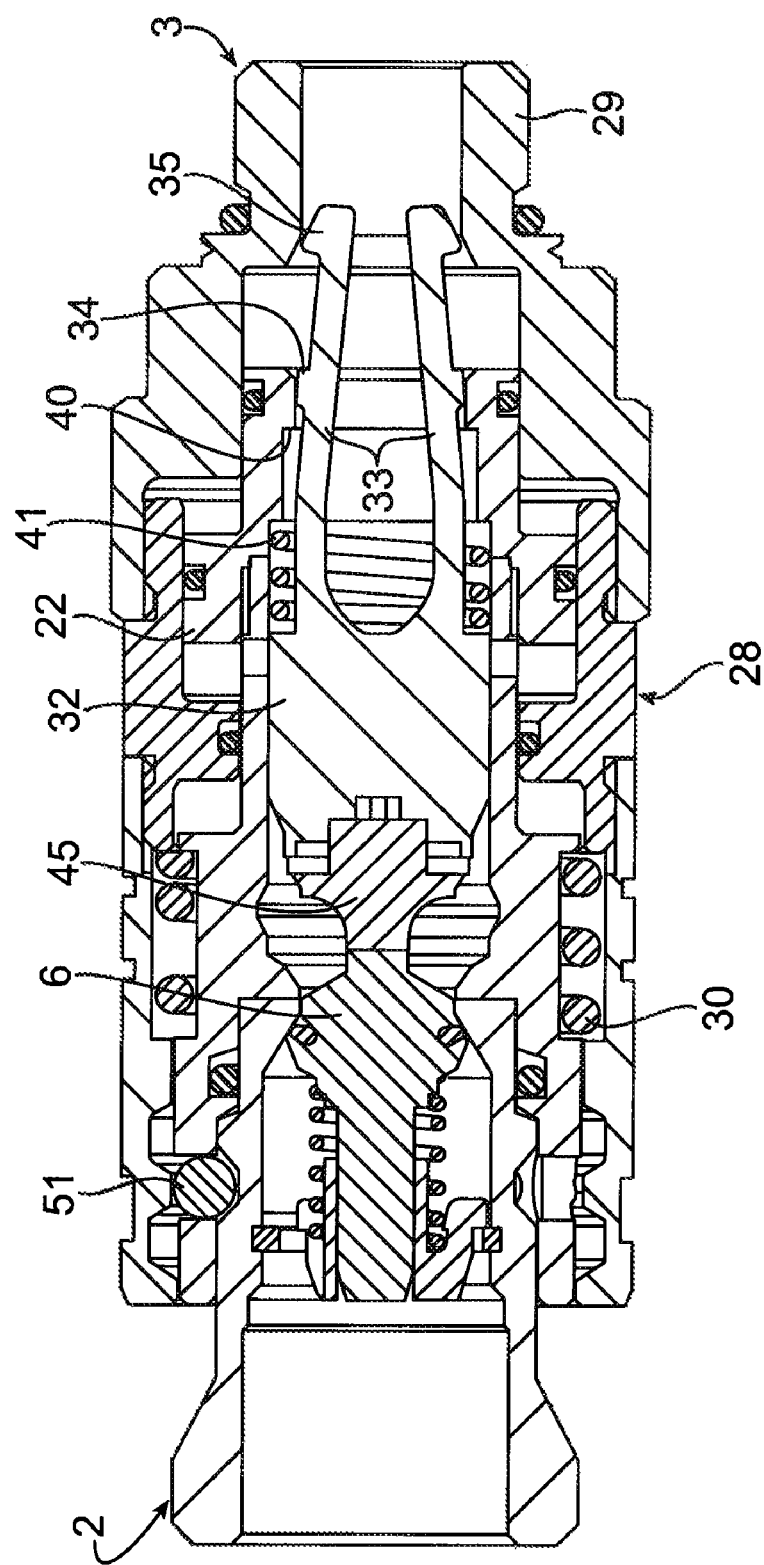

When the axial force of engagement of the male element 2 in the female element 3 is released as depicted in FIG. 4, the spring 30 is released and returns the internal body 22 and the external sleeve 28 to their original relative position, the ends of the legs 33 still being "narrowed" inside the adapter 29.

Figure 5:
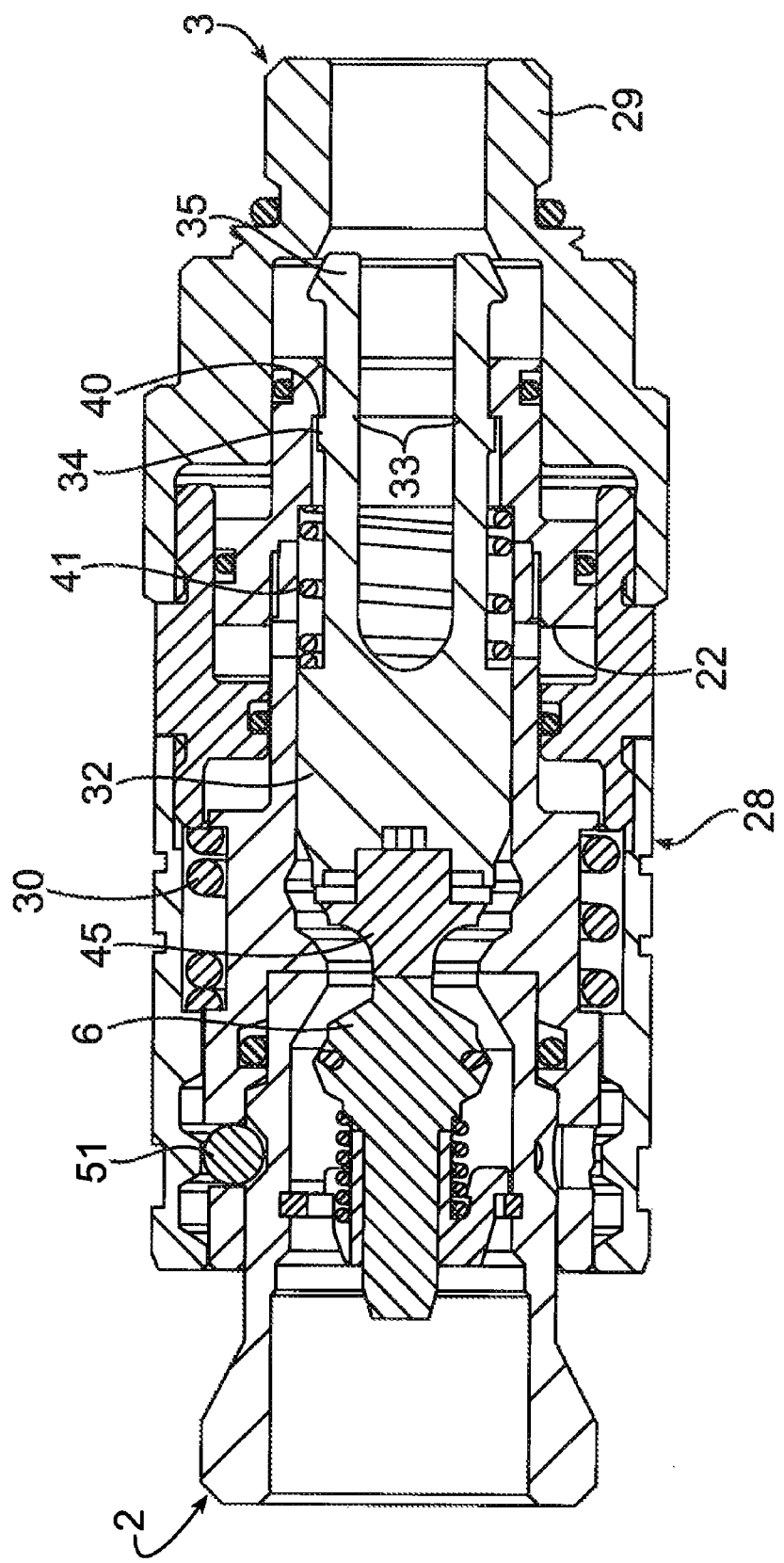

When pressure is established in the female element 3, the fluid moves the member 32 and the shutter 45 to the left in the figures as far as their position depicted in FIG. 5.

By virtue of the spring 41, the two valves are therefore opened, with the two shutters 6 and 45 immobilized, the shutter 6 being in abutment against the fixed limit stop 9 and the shutter 45 and its support member 32 pressing against the spring 41.

The legs 33 are released from their position inside the adapter 29 and return to the un-narrowed "open" position through their natural elasticity. They therefore come into abutment via their projections 34 against the annular shoulder 40 (of the travel limit stop) of the component 20 of the body 22 so that the limit stop that limits the travel of the shutter 45 is re-established.

Disconnection (see FIG. 6) of the male 2 and female 3 elements is performed by pulling on the male element, this moving the internal body 22 to the left until the balls 51 enter the groove 56. The valve of the female element 3 is then closed and sealed.

The flow of fluid through the member 32 is undisturbed and the guide fins 47 optimize this flow.

Furthermore, the shutter 45 forms an integral part of the member 32 and is perfectly guided in the body 22, which gives the valve the ability to withstand high pressures.

The spring 9 is softer than the spring 41 which means that if there is no pressure in the male element 2, the valve of the male element 2 opens (see FIG. 7) merely under the return force of the spring 41 which force, in accordance with standard ISO7241-A for ½" pipe, is greater than 45 N.

The member 32 in this instance is made of a highly technical thermoplastic that could equally be made of brass, stainless steel or any other material capable of meeting the following specifications:

a longitudinal elastic modulus that is high in order to withstand the compression loadings resulting from the axial component of the hydrodynamic forces;
  a transverse elastic modulus that is high in order to develop sufficient force for returning the legs 33 of the member 32 to the open (un-narrowed) position thus butting against the shoulder 40;
  a coefficient of elongation A % that is high in order to tolerate significant deflection of the legs 33 without remnant deformation;
  the ability to uphold minimum characteristics at temperatures in excess of 110° C.

As goes without saying, the invention is not restricted to the single embodiment described hereinabove by way of indicative example; on the contrary, it encompasses all embodiment and application variants thereof that follow the same principle. Thus, in particular, it would not be a departure from the scope of the invention if the shutter 45 or the member 32 were to be made of several assembled elements made of the same material or different materials.

It would also be possible to design a similar mechanism with a member again in the form of ridged tongs, but secured to the adapter 29.

During the connection phase, upon the retreat movement, this member is made to close by the piston (component 20) thus retracting during the double travel retreat of the shutter 45 of the female element. In equilibrium, by virtue of its elasticity, the "tongs" re-open to the open position and provide the shutter 45 with a positive limit stop effect once the shutter has returned to the circuit-open position.

This alternative, which does not fall within the context of the present invention, is of some benefit in the selection of materials which can then be more conventional than in the present invention because the technical and dimensional characteristics can be divided across two components rather than exhibited by just one.

By contrast, the characteristics of this version are limited in terms of the maximum authorized return flow rate. This limit is directly linked with the spring force characteristics of the spring 30 that returns the mobile internal body 22.

Specifically, all the shutters of the male 2 and female 3 elements are subjected to hydrodynamic forces, in a flow from the male element 2 toward the female element 3, which will push on the "tongs" of the adapter 29 namely an element of the fixed external sleeve 28. Further, the force reacting these hydrodynamic loadings is provided by the mechanism that locks the male element 2 which is secured to the mobile internal body 22 of the female element 3 and therefore has a tendency to leave the fixed external sleeve 28. Only the spring 30 compensates for this phenomenon between the two fixed and mobile frames of reference and when the force due to the hydrodynamic forces becomes greater than the spring force of the spring 30, the male element 2 becomes uncoupled unintentionally and causes the hydraulic circuit to be suddenly closed. The male element 2 has then to be recoupled in order to make the hydraulic system operational again.

The limits observed on a test rig demonstrate that accidental disconnection occurs at around about 150 l/min for a spring 30 rated at 220 N and ½" hydraulic coupling with relatively continuous passage cross sections of about 100 mm$^2$.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A female member for a locking connection in a fluid coupling with a male member having an normally closed first valve element of the coupling, the female member comprising:
   an external sleeve having a forward end for insertably receiving the male member and a rearward end;
   an internal tubular body axially slidably movable within the sleeve, the body having a radially inwardly extending shoulder and being biased in a forward position; and
   a second valve element axially slidably movable within the body, the first valve element being openable responsive to the movement of the second valve element, and the second valve element being biased in a normally closed forward orientation and including a tubular stop member, the stop member having a radially outwardly extending projection and being resiliently collapsible radially inwardly from a normal diameter to a reduced diameter, the projection being abuttable against the body shoulder in the normal diameter of the stop member delimit the rearward movement of the second valve element,
   wherein responsive to the axial force of the male member being inserted into the sleeve forward end, the body is retractable from its forward position to a rearward position and the second valve element is retractable from its forward orientation to a rearward orientation collapsing the stop member to a reduced diameter allowing the projection to pass under the shoulder, and upon the release of such force, the body is returnable to its forward position locking the male member to the female member with the stop member projection being retained under the body shoulder, and
   whereupon responsive to fluid pressure in the female member, the second valve element is moved forwardly to an intermediate open orientation opening the first valve element and returning the stop member to its normal diameter and disposing the projection forward of the shoulder such that the projection is abuttable against the body shoulder delimiting rearward movement of the second valve element.

2. The female member of claim 1 wherein the stop member has at two longitudinal slots therethrough forming a pair of legs, the legs defining the normal diameter of the stop member and being collapsible radially inwardly defining the reduced diameter of the stop member.

3. The female member of claim 1 wherein the stop member has a rearward end face and the sleeve has a radially-inwardly extending annular surface adjacent the rearward end of the sleeve, the stop member rearward end face being cammingly engagable against the annular surface of the sleeve effecting the collapsing of the stop member as the second valve element is retracted from its forward orientation to its rearward orientation.

4. A fluid coupling comprising a male member having an normally closed first valve element, and a female member lockably connectable to the male member, the female member comprising:
   an external sleeve having a forward end for insertably receiving the male member and a rearward end;
   an internal tubular body axially slidably movable within the sleeve, the body having a radially inwardly extending shoulder and being biased in a forward position; and
   a second valve element axially slidably movable within the body, the first valve element being openable responsive to the movement of the second valve element, and the second valve element being biased in a normally closed forward orientation and including a tubular stop member, the stop member having a radially outwardly extending projection and being resiliently collapsible radially inwardly from a normal diameter to a reduced diameter, the projection being abuttable against the body shoulder in the normal diameter of the stop member delimit the rearward movement of the second valve element,
   wherein responsive to the axial force of the male member being inserted into the sleeve forward end, the body is retractable from its forward position to a rearward position and the second valve element is retractable from its forward orientation to a rearward orientation collapsing the stop member to a reduced diameter allowing the projection to pass under the shoulder, and upon the release of such force, the body is returnable to its forward position locking the male member to the female member with the stop member projection being retained under the body shoulder, and
   whereupon responsive to fluid pressure in the female member, the second valve element is moved forwardly to an intermediate open orientation opening the first valve element and returning the stop member to its normal diameter and disposing the projection forward of the shoulder such that the projection is abuttable against the body shoulder delimiting rearward movement of the second valve element.

5. The coupling of claim 4 wherein the stop member has at two longitudinal slots therethrough forming a pair of legs, the legs defining the normal diameter of the stop member and being collapsible radially inwardly defining the reduced diameter of the stop member.

6. The coupling of claim 4 wherein the stop member has a rearward end face and the sleeve has a radially-inwardly extending annular surface adjacent the rearward end of the sleeve, the stop member rearward end face being cammingly engagable against the annular surface of the sleeve effecting the collapsing of the stop member as the second valve element is retracted from its forward orientation to its rearward orientation.

* * * * *